(12) United States Patent
Ton et al.

(10) Patent No.: US 9,694,867 B2
(45) Date of Patent: Jul. 4, 2017

(54) LOCKING RACK SYSTEM FOR BICYCLES

(71) Applicant: Bell Sports, Inc., Scotts Valley, CA (US)

(72) Inventors: Tony M. Ton, San Jose, CA (US); Robin Samson, Santa Cruz, CA (US); Joseph William Brody, Campbell, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

(21) Appl. No.: 15/091,243

(22) Filed: Apr. 5, 2016

(65) Prior Publication Data

US 2016/0214669 A1    Jul. 28, 2016

Related U.S. Application Data

(63) Continuation-in-part of application No. 13/831,078, filed on Mar. 14, 2013, now Pat. No. 9,302,725.

(51) Int. Cl.
| | |
|---|---|
| *B62J 9/00* | (2006.01) |
| *F16B 2/10* | (2006.01) |
| *F16M 13/02* | (2006.01) |
| *B62H 5/00* | (2006.01) |
| *B62J 7/04* | (2006.01) |

(52) U.S. Cl.
CPC .............. *B62J 9/001* (2013.01); *B62H 5/001* (2013.01); *B62J 7/04* (2013.01); *F16B 2/10* (2013.01); *F16M 13/02* (2013.01)

(58) Field of Classification Search
CPC ..... B62J 7/04; B62J 9/001; F16B 2/10; B62H 5/001; F16M 13/02
USPC ....... 224/422, 423, 427, 430, 431, 435, 440, 224/443, 447, 449, 450, 452, 453, 454
See application file for complete search history.

(56) References Cited

U.S. PATENT DOCUMENTS

| | | | | |
|---|---|---|---|---|
| 4,966,382 A * | 10/1990 | Giles | ................... | B62J 11/00 224/275 |
| 5,435,471 A * | 7/1995 | Chuang | ................... | B62J 9/00 224/419 |
| 5,579,971 A * | 12/1996 | Chuang | ................... | B62J 9/001 224/430 |
| 5,836,491 A * | 11/1998 | Chuang | ................... | B62H 5/00 224/443 |
| 6,095,473 A * | 8/2000 | Engers | ................... | B62J 7/08 224/425 |
| 6,474,097 B2 * | 11/2002 | Treppedi | ................ | A45C 11/20 280/30 |

(Continued)

*Primary Examiner* — Corey Skurdal
(74) *Attorney, Agent, or Firm* — Booth Udall Fuller, PLC

(57) ABSTRACT

A lockable bicycle rack system includes a mounting clip and a rack configured to detachably couple to a bicycle frame. The rack includes a body, a lid pivotally coupled to the body between an open position and a closed position, and a locking mechanism. The mounting clip is coupled to the rack and includes a base component adapted to couple to a container, a rack receiving gap, and a lever arm having a rack latch that extends at least partially across the rack receiving gap when the lever arm is in a locked position. A side member of the body extends through and is locked within the rack receiving gap when the rack latch is in the locked position, and a side member of the lid prevents the lever arm from leaving the locked position when the lid is in the closed position.

20 Claims, 14 Drawing Sheets

(56) References Cited

U.S. PATENT DOCUMENTS

| | | | | |
|---|---|---|---|---|
| 7,389,608 B1* | 6/2008 | MacKay | ............... | A01K 97/05 |
| | | | | 206/315.11 |
| 8,453,895 B2* | 6/2013 | Vitanza | ................ | B62J 7/04 |
| | | | | 224/422 |
| 8,925,752 B2* | 1/2015 | Smith | ................ | F25D 3/08 |
| | | | | 220/23.4 |
| 2003/0106143 A1* | 6/2003 | Lhoste | ................ | E03D 9/032 |
| | | | | 4/222 |
| 2004/0211804 A1* | 10/2004 | Lee | ................ | B62H 5/003 |
| | | | | 224/427 |
| 2006/0138185 A1* | 6/2006 | Lien | ................ | B62J 7/00 |
| | | | | 224/427 |
| 2006/0186159 A1* | 8/2006 | Lawrence | ................ | B62J 7/04 |
| | | | | 224/422 |
| 2009/0159626 A1* | 6/2009 | Hoidal | ................ | B62J 7/04 |
| | | | | 224/416 |
| 2010/0237208 A1* | 9/2010 | Di Lollo | ................ | A47J 47/16 |
| | | | | 248/213.2 |
| 2015/0150231 A1* | 6/2015 | Norman | ................ | A01K 97/08 |
| | | | | 43/17.5 |

* cited by examiner

LOCKING RACK SYSTEM FOR BICYCLES

CROSS REFERENCE TO RELATED APPLICATIONS

This application is a continuation-in-part application of the earlier U.S. Utility Patent Application to Ton et al. entitled "Locking Rack System for Bicycles," application Ser. No. 13/831,078, filed Mar. 14, 2013, now pending, the disclosure of which is hereby incorporated herein by reference.

BACKGROUND

1. Technical Field

Aspects of this document related generally to the field of package and article carriers. In particular, embodiments are directed to a locking rack system for bicycles.

2. Background Art

Due at least in part to economic, environmental, and fitness advantages, many people are turning to bicycles in order to meet their daily transportation needs. However, most people still rely on expensive and less environmentally friendly automobiles in situations where they want or need to carry and store items that may be stolen or subject to unwanted public attention. For example, if someone rides their bicycle to a video store, rents a few videos, and then rides to the grocery store to pick up some fruit, they may not want to or be permitted to bring the video rentals into the grocery store with them. Since leaving the rentals with their bicycle could result in the videos being stolen, and since automobiles provide a far more reasonable expectation of security and privacy, this can lead to people choosing to use their automobiles when they might otherwise use their bicycles.

In spite of this, many people still choose to use their bicycles in situations where they want or need to carry and store items that may be stolen or subject to unwanted public attention. This manifests itself in the makeshift locking of bags, helmets and other items to luggage racks (or "cargo racks") and/or to bicycles themselves that can often be observed on municipal bicycle racks in most urban settings.

SUMMARY

According to one aspect, a lockable bicycle rack system comprises a rack and a mounting clip. The rack comprises a body comprising a side member, a lid comprising a side member and pivotally coupled to the body between an open position and a closed position, and a locking mechanism configured to lock the lid in the closed position, the rack being configured to detachably couple to a bicycle frame. The mounting clip is coupled to the rack and comprises a base component adapted to couple to a container, a rack receiving gap, and a lever arm comprising a rack latch that extends at least partially across the rack receiving gap when the lever arm is in a locked position. The side member of the body of the rack extends through the rack receiving gap and is locked within the rack receiving gap when the rack latch is in the locked position and the side member of the lid prevents the lever arm from leaving the locked position when the lid is in the closed position.

Various implementations and embodiments may comprise one or more of the following. The mounting clip may comprise two fixed arms, each fixed arm of the two fixed arms extending away from the base component and forming the rack receiving gap between a portion of the respective fixed arm and the base component, wherein the lever arm is positioned between the two fixed arms. The side member of the lid may interface an outer surface of each of the two fixed arms and an outer surface of the lever arm when the lid is in the closed position to prevent the lever arm from leaving the locked position. The two fixed arms form only the rack receiving gap and the mounting clip is devoid of a lid receiving gap formed by an extending component. The rack latch may extend across at least 75% of the rack receiving gap when the lever arm is in the locked position. An extending component extending from the two fixed arms, the extending component forming an upwardly directed lid receiving gap between a portion of the extending component and the outer surfaces of the two fixed arms, wherein the lid receiving gap is positioned to receive the side member of the lid and prevent the lever arm from leaving the locked position when the lid is in the closed position, and wherein the rack receiving gap comprises a downwardly directed rack receiving gap. The rack latch may extend across at least 50% of the rack receiving gap when the lever arm is in the locked position. The lever arm may be biased to the locked position and the lever arm further comprises a grip post distal the rack latch. The mounting clip may comprise a plurality of mounting clips configured to couple to a channel member fixed to the container.

According to another aspect a lockable bicycle rack system comprise a rack and a mounting clip. The rack is configured to detachably couple to a bicycle frame, and the rack comprises a first side member and a second side member movable between a first position and a second position. The mounting clip is coupled to the rack and comprises a base component adapted to couple to a container, a rack receiving gap, and a lever arm comprising a rack latch extending at least partially across the rack receiving gap. A portion of the first side member is positioned within the rack receiving gap and held within the rack receiving gap by the rack latch and the second side member prevents the rack latch from exiting the rack receiving gap when the second side member is in the first position and the allows the rack latch to exit the rack receiving gap when the second side member is in the second position.

Various implementations and embodiments may comprise one or more of the following. The rack may comprise a body comprising the first side member and a lid pivotally coupled to the body and comprising the second side member, wherein the second side member is in the first position when the lid is in a closed position and is in the second position when the lid is in an open position. The mounting clip may comprise a fixed arm extending away from the base component and forming the rack receiving gap between a portion of the respective fixed arm and the base component, and the second side member of the lid may interface an outer surface of the fixed arm and an outer surface of the lever arm when the lid is in the closed position to prevent the lever arm from exiting the rack receiving gap. An extending component extending from the fixed arm, the extending component forming an upwardly directed lid receiving gap between a portion of the extending component and the outer surfaces of the fixed arm, wherein the lid receiving gap is positioned to receive the second side member of the lid and prevent the lever arm from exiting the rack receiving gap when the lid is in the closed position, and wherein the rack receiving gap comprises a downwardly directed rack receiving gap. The lever arm may bias the rack latch towards the base component to extend across a portion of the rack receiving gap, and wherein the lever arm further comprises a grip post distal the rack latch. The mounting clip may comprise a plurality of mounting clips configured to couple to a channel member fixed to the container.

According to another aspect, a mounting clip for coupling and locking a container to a bicycle rack comprises a base component, a fixed arm, and a lever arm. The base component is adapted to couple to a container. The fixed arm extends from the base component and forms a rack receiving gap positioned between a portion of the fixed arm and the base component, the rack receiving gap configured to receive a side member of a body of a bicycle rack. The lever arm is pivotally coupled to the fixed arm and comprises a rack latch, wherein the rack latch extends at least partially across the rack receiving gap when the lever arm is in a locked position and is configured to hold the side member of the body of the bicycle rack within the rack receiving gap when the lever arm is in a locked position.

Various implementations and embodiments may comprise one or more of the following. The fixed arm may comprise two fixed arms, each fixed arm of the two fixed arms extending away from the base component and forming the rack receiving gap between a portion of the respective fixed arm and the base component, wherein the lever arm is positioned between the two fixed arms. An extending component extending from the two fixed arms, the extending component forming an upwardly directed lid receiving gap between a portion of the extending component and the outer surfaces of the two fixed arms, wherein the lid receiving gap is positioned to receive the side member of the lid and prevent the lever arm from leaving the locked position when the lid is in the closed position, and wherein the rack receiving gap comprises a downwardly directed rack receiving gap. The lever arm may be biased to the locked position and the lever arm may further comprise a grip post distal the rack latch. The base component may comprise one or more through holes extending through the base component, each through hole of the one or more through holes configured to receive a screw for coupling the mounting clip to a container.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present disclosure overcome the disadvantages of not being able to securely carry and store items on a bicycle by providing a locking luggage rack system. In an exemplary embodiment, the system comprises luggage racks with integrated locks and spring-biased hinged components, rack-top bags, mounting clips and associated security rails, and security hooks.

Figure 1:
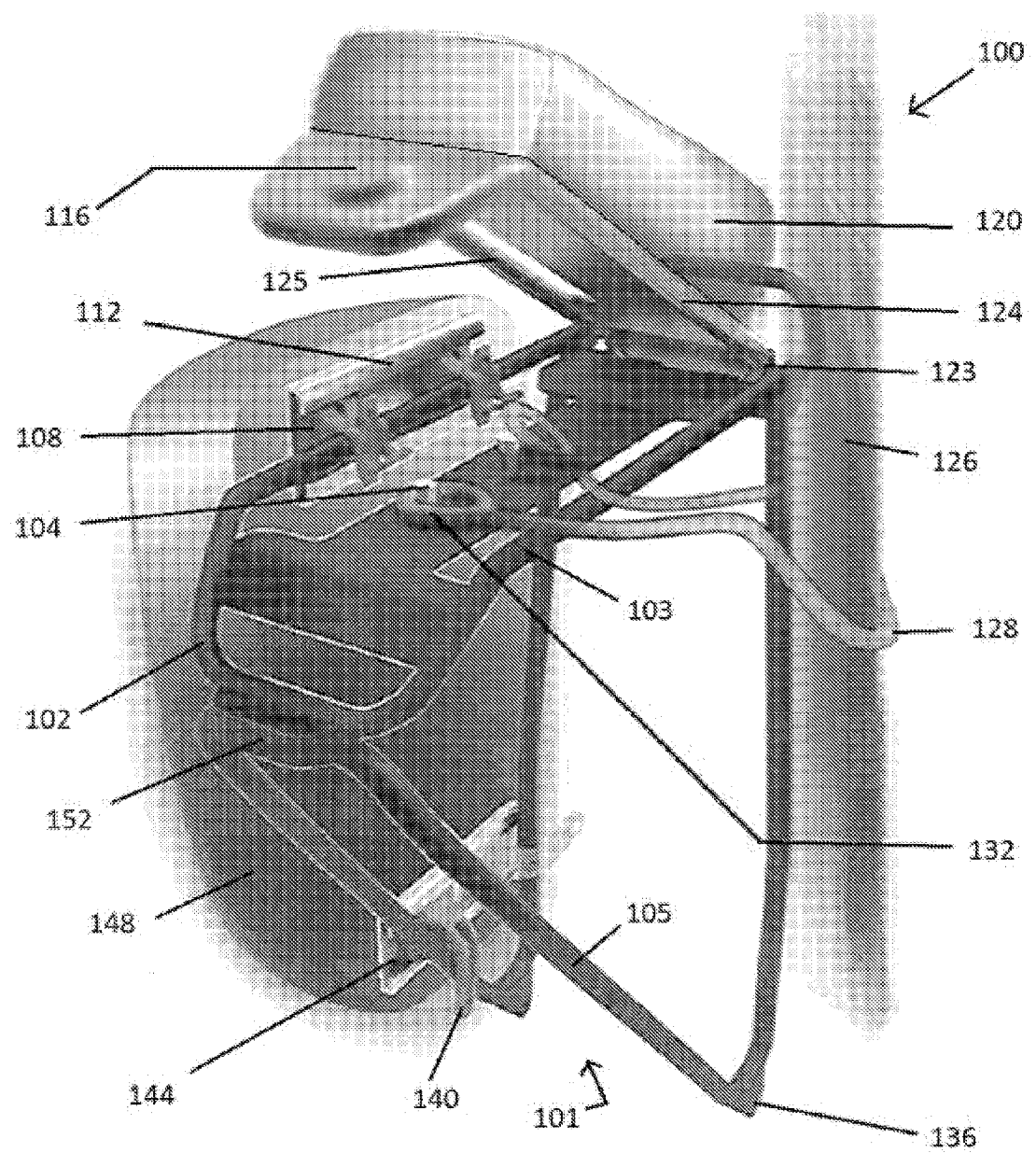
FIG. 1 is a perspective view of a luggage rack system according to an exemplary embodiment with an integrated lock and a bag, security hooks, and pannier with a security rail and mounting clips attached.

FIG. 1 shows an exemplary luggage rack system 100 comprising a rack 101 and lockable bags 120, 148. Rack 101 includes a fixed component or rack body 102 and a hinged lid 124 attached to the rack body by pivot or hinge 123. Rack body 102 includes side members 103 and struts 105, and lid 124 includes side members 125. The side members of each cooperate to form a fixed locking space 228 (see FIG. 2C) between the members when the lid is closed and thus capture mounting clips there between as described below to securely lock bags carried by the rack system on the bicycle. In the embodiment shown, lid 124 also includes an integrated lock 116. Features of system 100 as described in more detail below include rack-top bag 120, security hooks 104, and a pannier 148 with security rails 112, 144, mounting clips 108, and mounting hooks 140 attached thereto.

Rack 101 of the luggage rack system 100 may be attached to a bicycle at an attachment point 136 or in any other suitable way. A reflector or light bracket 152 may be attached to the back of the luggage rack 101. The pannier 148 has security rails 112, 144 permanently affixed to a surface thereon. The mounting clips 108 and mounting hooks 140 are slidably adjustable within the security rails 112, 144 until screws (not shown) passing through the mounting clips 108 and mounting hooks 140 are tightened. This slidable adjustability provides a "universal fit" in that it allows the pannier 148 to be attached to nearly any size or shape of luggage rack. Once installed on the luggage rack 101, the pannier 148 may be locked to the rack 101 by simply closing the lid 124 of the rack 101 and locking the lock 116 integrated with the rack 101. The lid 124 of the rack 101, upon being closed and locked, engages the mounting clips 108 such that the mounting clips 108, and thus the pannier 148, cannot be removed from the rack 101. Additionally, as described in more detail below in connection with FIGS. 4A-D, side members 125 of lid 124, in cooperation with side members 103 of rack body, prevent access to screws securing mounting clips 108 to security rails 112.

In an exemplary embodiment, a security cable 128 may be wrapped around a fixed object 126 (such as a tree, lamp post, or municipal bicycle rack) and attached at its ends 132 to security hooks 104 built into the luggage rack 101. The lid 124 of the rack 101, upon being closed and locked, abuts or nearly abuts the security hooks 104 such that the security cable 128 cannot be removed from the security hooks 104.

Figure 2A:
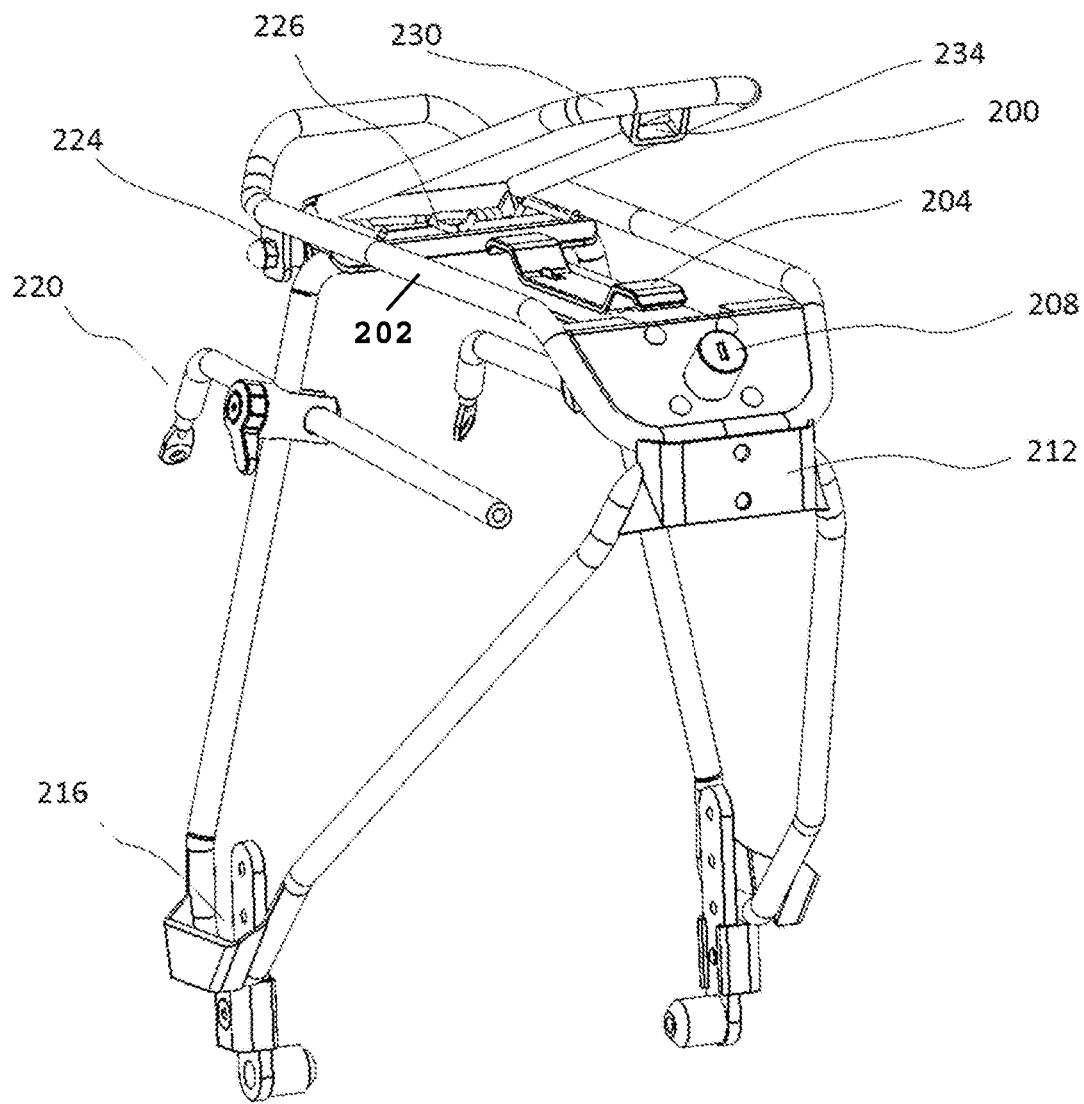
FIG. 2A is a perspective view of a luggage rack in an unlocked, open position with integrated lock and security hooks according to an embodiment.

FIG. 2A shows a luggage rack 200 with an integrated lock 208 and security hooks 204 according to an alternative embodiment. The luggage rack 200 may be attached to a bicycle with universal fit attachments 216, 220 as is known in the art or in any other suitable way. A reflector (or tail-light or headlight) bracket 212 may be attached to the back of the luggage rack 200. The lid 230 of the rack 200 is rotatable about pivot 224 and may include a latch component 234 that interfaces with the integrated lock 208 in order to lock the rack 200 in a closed position. In an exemplary embodiment, a spring 226 may be provided in communication with the lid 230 such that the lid is spring-biased to close; however, in alternative embodiments, the lid 230 may be spring-biased to open. The luggage rack 200 may comprise elements similar to the luggage rack system 100 shown in FIG. 1, such as but not limited to a body 202, a side member 103 on the body 202, and a side member 125 of the lid 230.

Figure 2B:
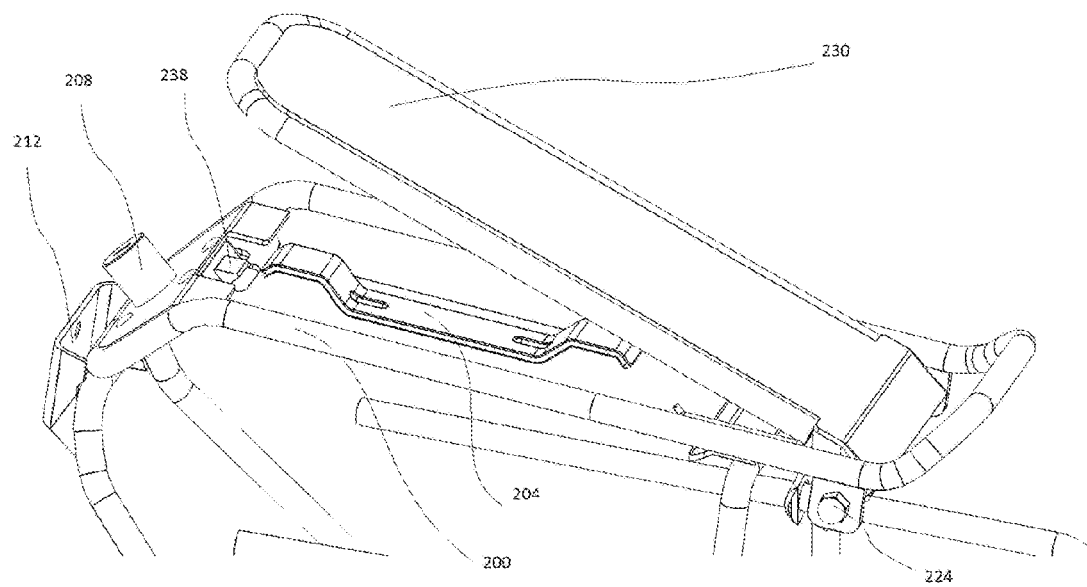
FIG. 2B is a detail view of locking components of the luggage rack shown in FIG. 2A.

FIG. 2B shows a detail view of the luggage rack 200 shown in FIG. 2A including the lid 230, the pivot 224 about which the lid rotates, the security hooks 204, the integrated lock 208, and the reflector (or tail-light or headlight) bracket 212. A latching component 238 of the integrated lock 208 is additionally shown. The latching component 238 of the integrated lock 208 interfaces with the latch component 234 (shown in FIG. 2A) attached to the lid 230 in order to lock the lid 230 to the rack 200 in a closed position.

Figure 2C:
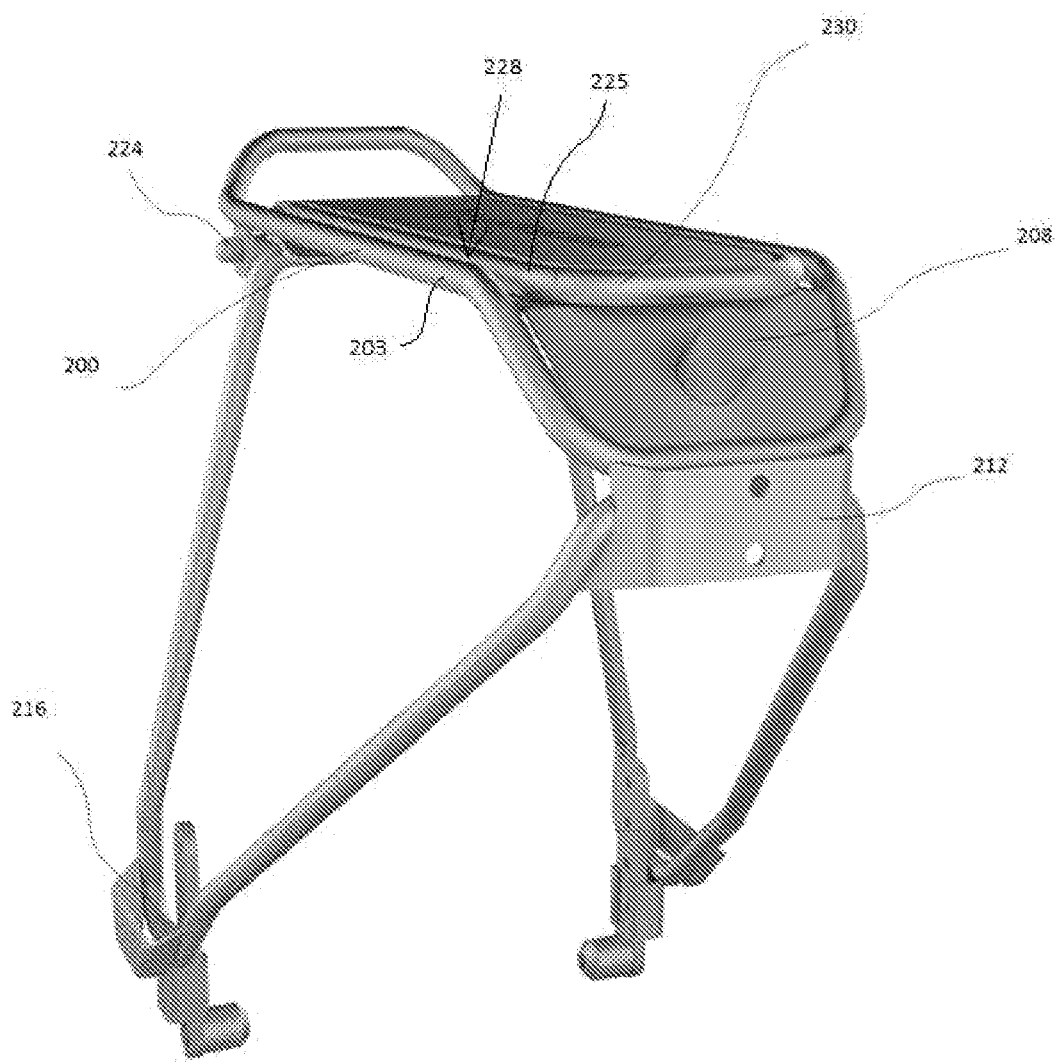
FIG. 2C is a perspective view of a luggage rack with an integrated lock in a closed, locked position according to another exemplary embodiment.

FIG. 2C shows a rear perspective view of the luggage rack 200 shown in FIG. 2A, including the lid 230, the pivot 224 the lid rotates about, the integrated lock 208, the reflector bracket 212, and universal fit attachments 216. In this view, the lid 230 is closed and fixed locking space 228 can be seen as formed by the spacing of rack body side member 203 and lid side member 225 in the closed and locked position. The lid may be locked by locking the integrated lock 208.

Figure 3A:
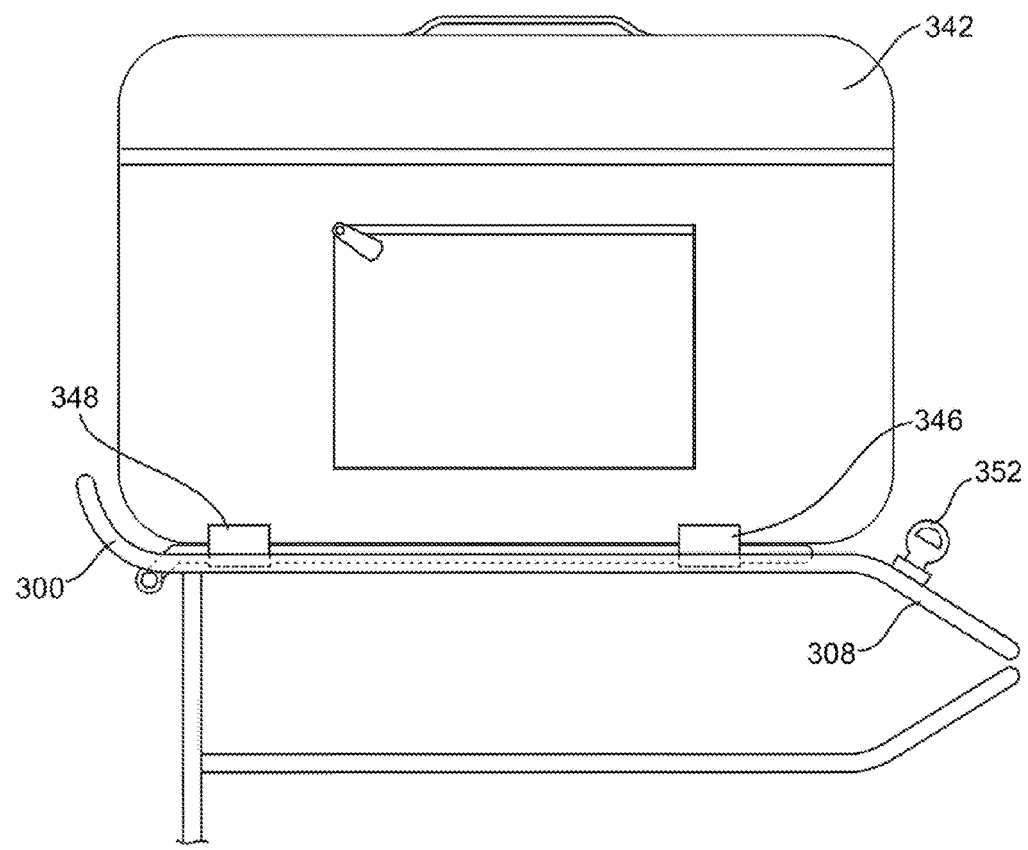
FIG. 3A is a side view of an embodiment of a rack-top bag installed on a luggage rack.

FIG. 3A shows a rack-top bag 342 installed on a luggage rack 300 according to an alternative embodiment of the present disclosure. The rack-top bag 342 comprises straps 346, 348 attachable to the rack lid (see, for example, lid 330 in FIG. 3B) in order to secure the bag 342 to the rack 300. Also visible are the integrated lock 308 and a key 352 for operating the lock 308.

Figure 3B:
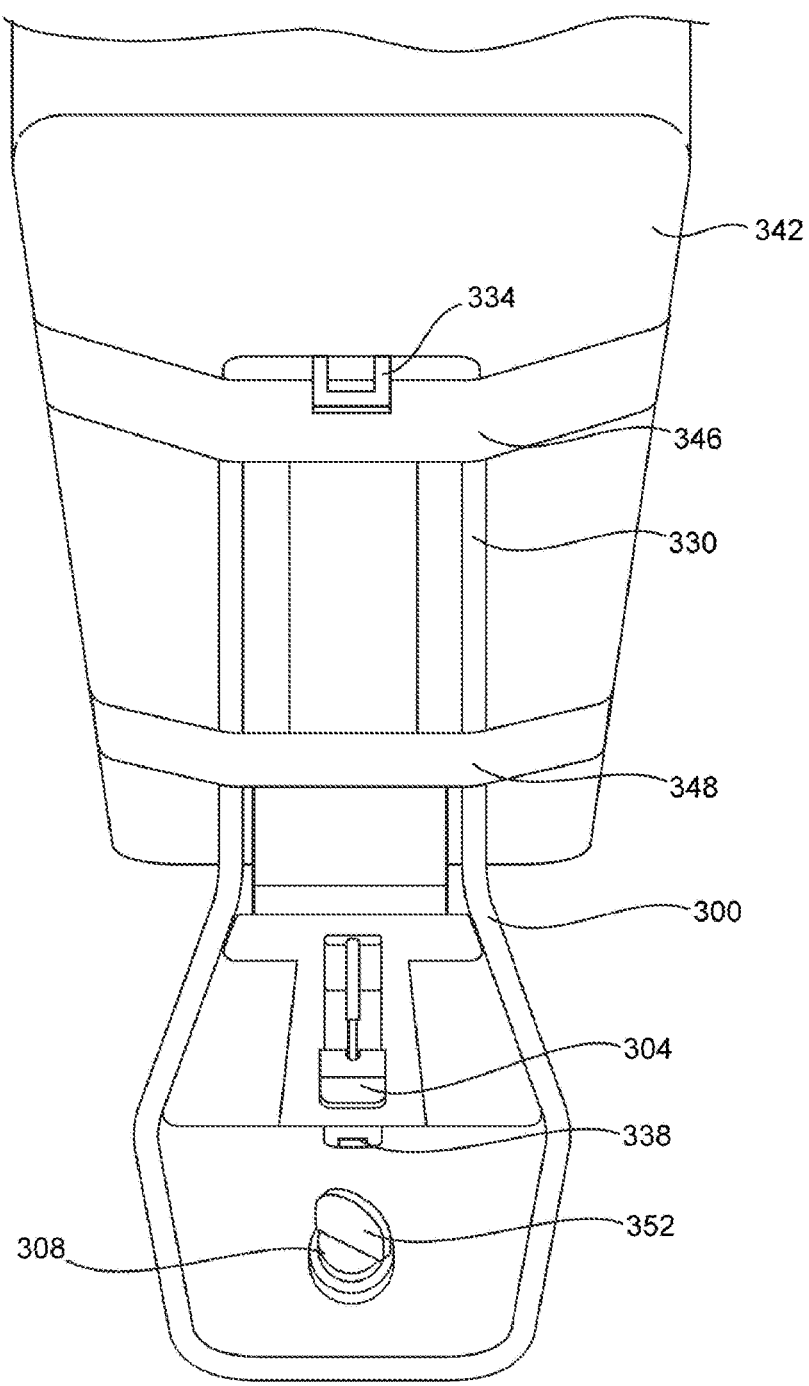
FIG. 3B is a detail view of the rack-top bag and luggage rack shown in FIG. 3A with the rack in an open position.

FIG. 3B shows a detail view of the rack-top bag 342 and luggage rack 300 shown in FIG. 3A with the rack lid 330 in an open position. The latch component 334 and latching component 338 are visible, as are the security hooks 304, the key 352, the integrated lock 308, and the lid 330. As shown, the rack-top bag 342 is secured to the lid 330 by attaching the straps 346, 348 to the lid 330 behind the latch component 334. In such an arrangement, upon the lid 330 of the rack 300 being closed and locked, the straps 346, 348 are secured and locked to the lid 330 and thus to the luggage rack 300. Attachment means other than straps 346 may be employed, such as connection by bolt-like members through the center plate of lid 330 or other clips, buckles, etc. wherein access to the attachment means is restricted when the lid is closed and locked.

Figure 4A:
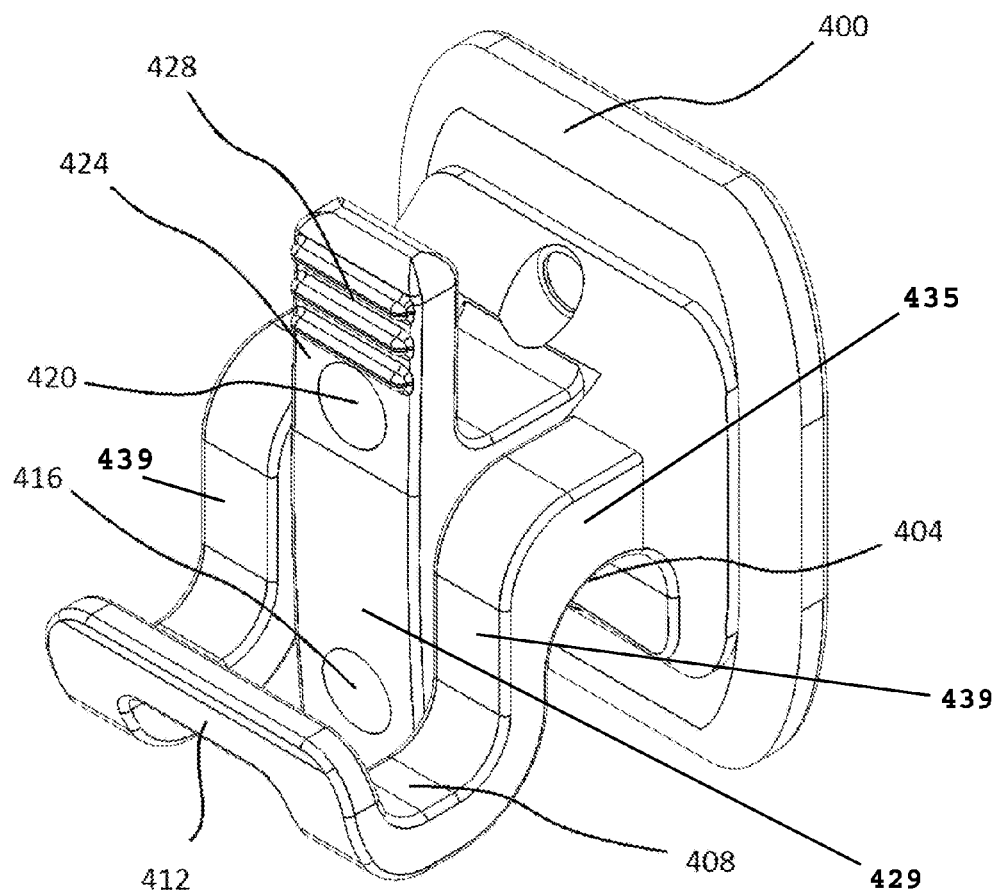
FIG. 4A is a perspective view of a first embodiment of a security clip.
Figure 4B:
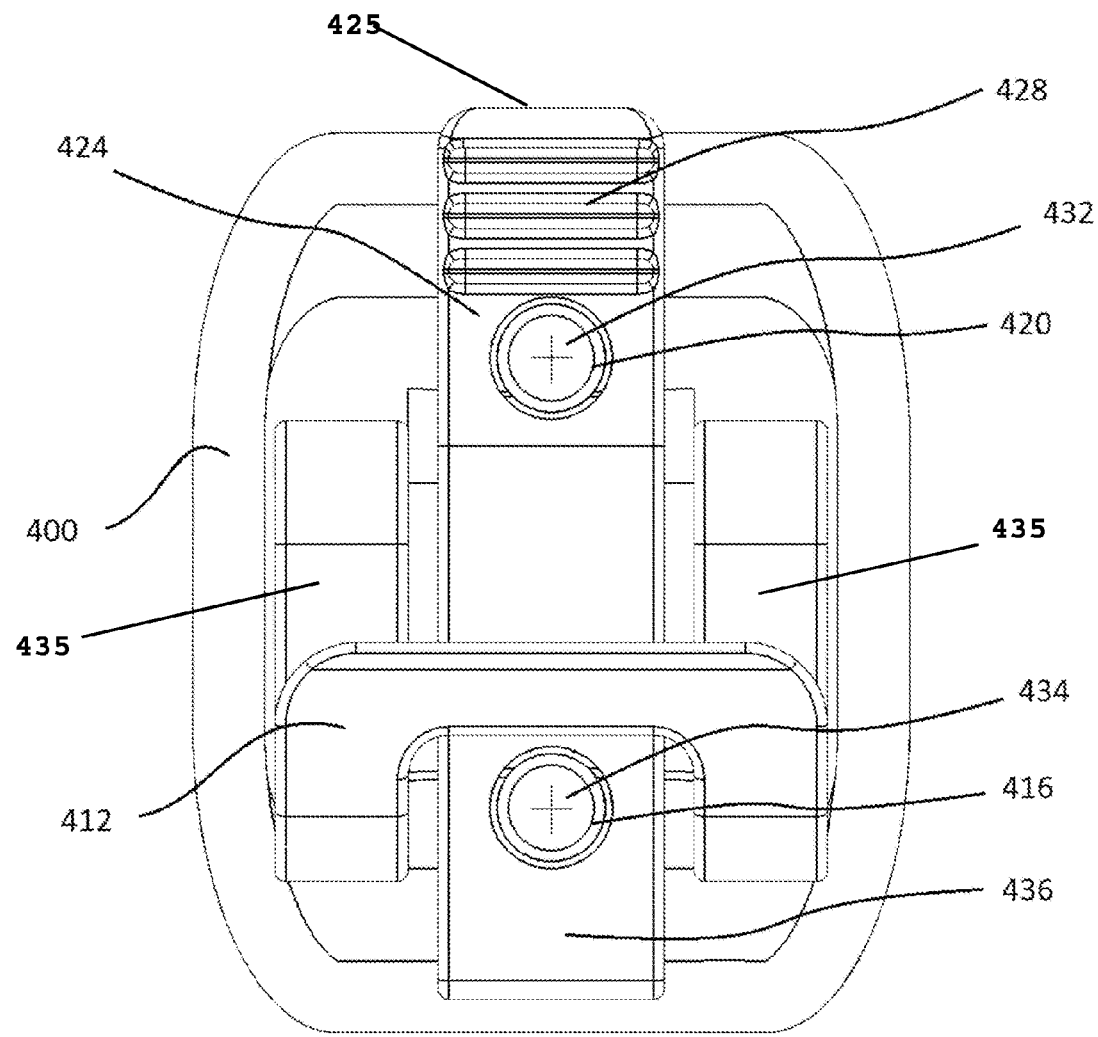
FIG. 4B is a front view of a first embodiment of a security clip.

FIGS. 4A-D show an accessory mounting clip 400 according to an exemplary embodiment. Clips 400 form attachment members for attaching various accessory components, such as panniers, containers, or baskets to the rack. FIG. 4A shows a perspective view of the mounting clip 400 including a lever arm 425 having a grip 428 and a grip post 424, through-holes 416, 420, a fixed arm 435 having an extending component 412, a lid-receiving gap 408, and a rack-receiving gap 404. FIG. 4B shows a front view of the mounting clip 400 including the grip 428, the grip post 424, the through-holes 416, 420, the through-hole axes 432, 434, the extending component 412, and the rack latch 436. The positions of rack members as received in the gaps when the clip is mounted on a rack are indicated by the dashed circles in FIG. 4C.

Figure 4C:
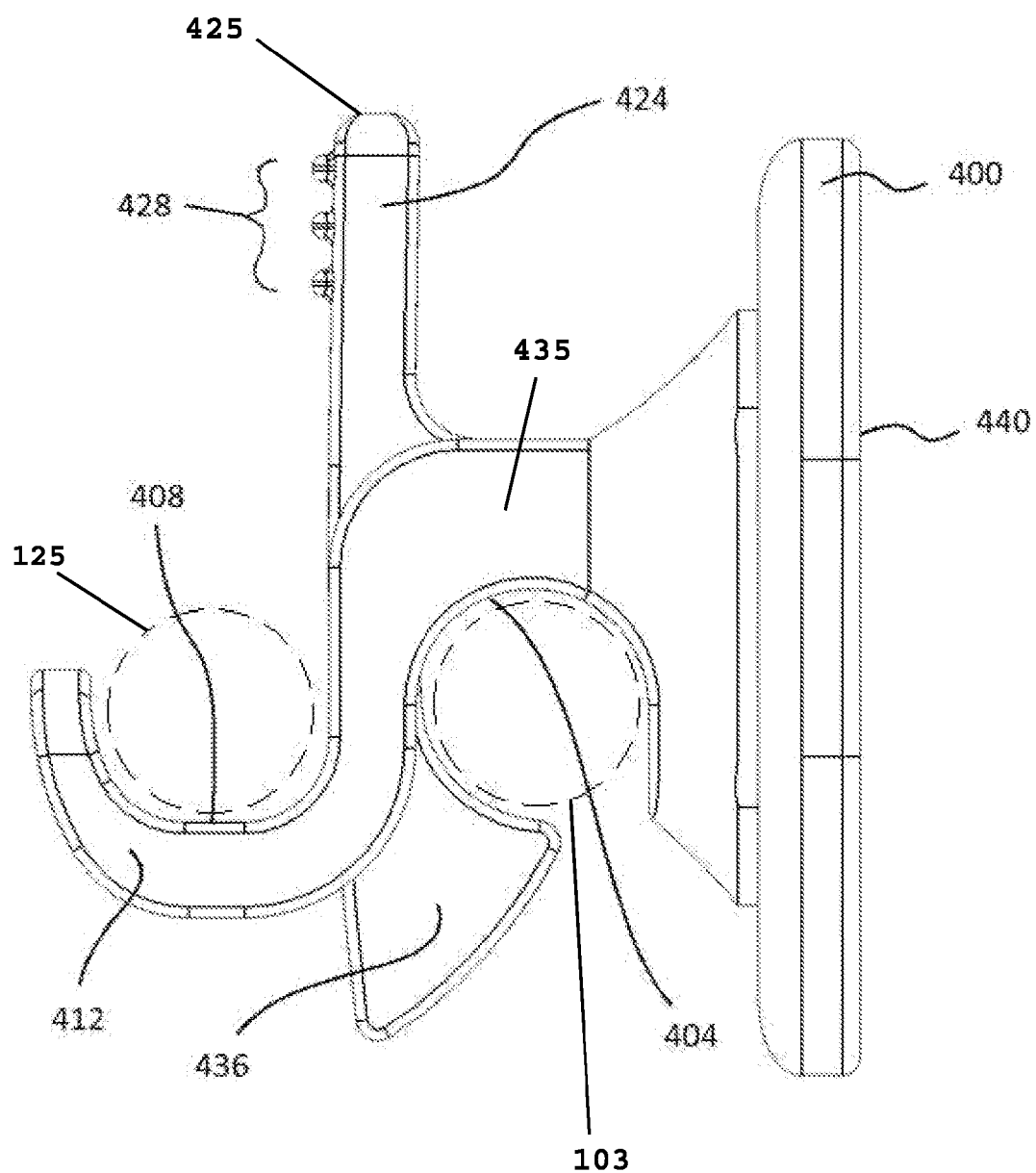
FIG. 4C is a side view of a first embodiment of a security clip.
Figure 4D:
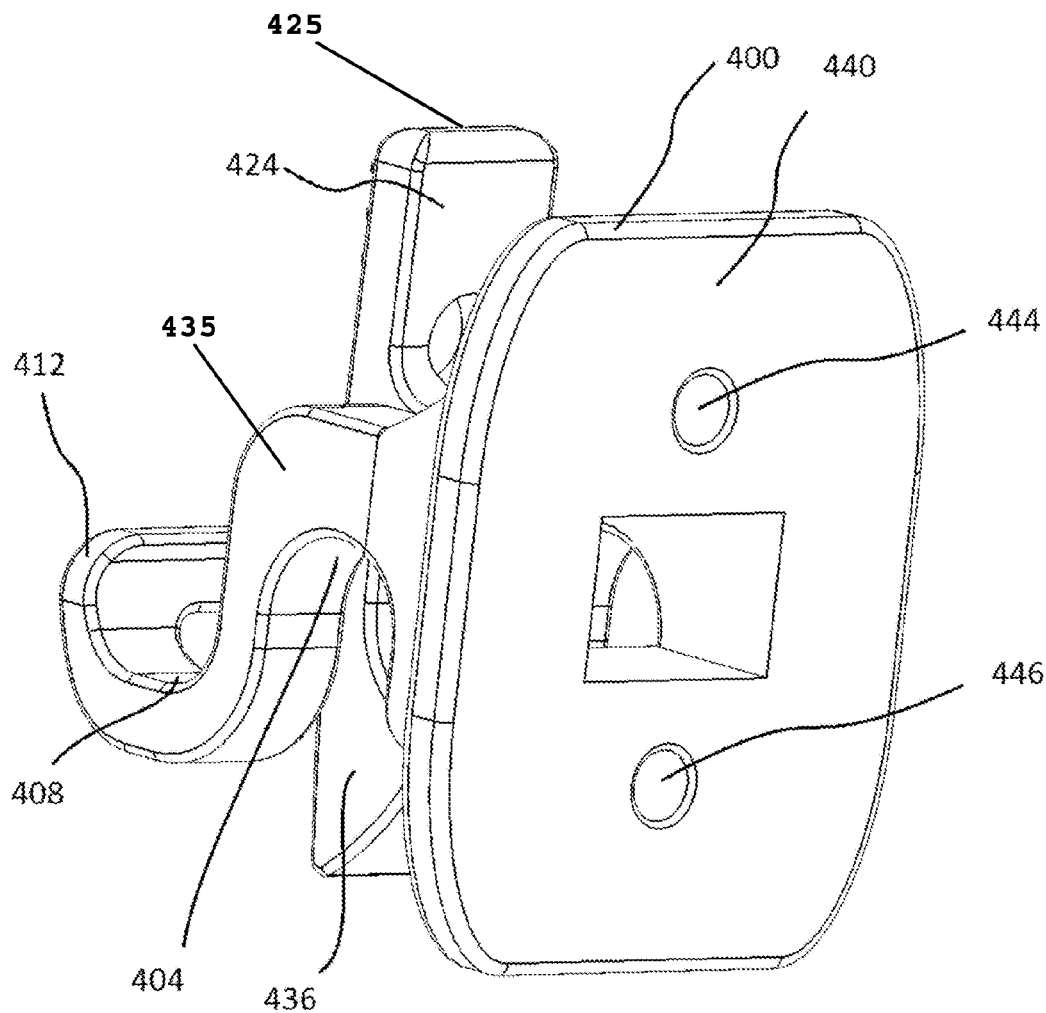
FIG. 4D is a rear perspective view of a security clip according to an embodiment of the present disclosure.

FIG. 4C shows a side view of the mounting clip 400 including the grip 428, the grip post 424, the extending component 412, the lid-receiving gap 408, the rack-receiving gap 404, the rack latch 436, and a back surface 440. In this position, the side member 103 of the body 202 is positioned within the rack receiving gap 404, and the side member 125 of the lid 230 is positioned within the lid receiving gap 408 and interfacing the outer surfaces 439, 429 of the fixed arm 435 and the lever arm 425, respectively. The side member 125 of the lid 230, therefore, restricts the lever arm 425 against opening the rack receiving gap 404. FIG. 4D shows a rear view of the mounting clip 400 including the grip post 424, the extending component 412, the lid-receiving gap 408, the rack-receiving gap 404, the rack latch 436, the back surface 440, and through-holes 444, 446. As described above and can be seen in FIG. 1, mounting clip 400, upon being inserted into a security rail 112, is limited to a single degree of freedom (i.e., sliding back and forth along the rail 112) by portions of the security rail 112 that retain top and bottom portions of the mounting clip 400.

To install a mounting clip 400 on a luggage rack, such as is shown in FIG. 1 or 2, force may be exerted on the grip 428 of the grip post 424 in order to cause the rack latch 436 to move in the opposite direction (since the grip post 424 and the rack latch 436 form a lever arm 425). This widens the rack-receiving gap 404 so that the mounting clip 400 may be attached to the rack by inserting a portion of the rack into the rack-receiving gap 404. The mounting clip 400 may also simply be forcibly pressed onto a portion of the rack in order to force a portion of the rack into the rack-receiving gap; however, it should be noted that this may result in scratching or otherwise damaging the rack.

To lock a mounting clip 400 in place, screws (not shown) are fitted through the through-holes 416, 420 along the axes 432, 434, and through the back surface 440 of the mounting clip 400 via through-holes 444, 446, at which point they begin to contact and press against the security rail. Tightening the screws presses the top and bottom portions of the mounting clip 400 against the retaining portions of the security rail 112 and prevents the mounting clip 400 from being slid along the security rail 112. When the lid 230, 330 is closed and locked on the rack, the side members 103, 125 of the body 202 of the rack 200 and rack lid 230, respectively, prevent access to the screws and thereby help to ensure the security of bags locked to the rack system 100 using clips 400.

Once mounting clips 108 are installed on a rack and locked in place, such as can be seen in FIG. 1, lid 124 may be lowered such that portions of the lid 124 are inserted into lid-receiving gaps of the mounting clips 108. Once the lid 124 is closed and the integrated lock 116 is locked, the screws (not shown) passing through the mounting clips 108 are no longer accessible, the mounting clips 108 are engaged by the lid via the lid-receiving gap, and the lid 124 substantially immobilizes the latching component of the clips 108; thus, the pannier 148 cannot be removed from the rack 101.

A rack may be fabricated from aluminum, steel, or any other suitable material. An integrated lock may comprise a lock-and-key, such as is shown in FIG. 3A and FIG. 3B, a combination lock, or any other suitable locking mechanism. A lock may be installed on the lid of the luggage rack, such as is shown in FIG. 1, on the rack itself, as shown in, e.g., FIG. 2C, or in any other suitable location. Panniers may be installed on either (as shown in FIG. 1) or both sides of the luggage rack, and the rack may be installed on the front (in front of the front fork) or the back (behind the seat) of a bicycle. Mounting clips may be fabricated from plastic, nylon, or any other suitably strong, suitably pliable polymer or material. Security rails may be fabricated from steel, aluminum, or any other suitable material. As is well-known in the art, stronger materials can provide better security, though they may also increase cost and/or weight.

In a further aspect, bags used therewith may themselves be provided with locking closures. This may be accomplished, for example, by use of locking bag provided with locking closures known in the art. Alternatively, the bags may be provided with locking hasps, zipper pulls or buckles with an opening configured to receive and be secured by a strap or cable lock, such as cable lock 128, and to be also secured by security hooks 104 in the same manner as shown for cable lock 128 in FIG. 1.

FIGS. 5A-5D depict various views of another non-limiting embodiment of a mounting clip 500. Unless otherwise specified, the mounting clip 500 and rack 200 may comprise any of the features described in relation to other mounting clips or racks disclosed herein or otherwise known in the art. Similar to the mounting clip 400 described above, when used with a rack 200, a mounting clip 500 is configured to prevent removal of the mounting clip 400 (and any container 148 coupled thereto) from the rack 200 when the lever arm 525 is in a locked position (shown in FIG. 5B) and the lid 230 is in a closed position. Although reference is made herein to a lid 230 having a side member 125 that blocks or otherwise restricts the lever arm 525 from exiting the locked position, it is contemplated that a side member separate from or without a lid 230 may be utilized to block or otherwise restrict the lever arm 525 from exiting the locked position. A mounting clip 500 may be coupled to a container 148 with screws extending through the base component 502 at through holes 544, 546.

According to some aspects, a mounting clip comprises a base component 502 adapted to couple to a container 148 and/or guides 112, a rack receiving gap 504, and a lever arm 525. A lever arm may comprise a grip post 524 and a rack latch 536 distal the grip post 524. Like the lever arm 425 shown in FIGS. 4A-D, the lever arm 525 of the mounting clip shown in FIGS. 5A-D is movable between a locked position and an unlocked position. The rack latch 536 is sized and configured to extend at least partially across the rack receiving gap 504 when the lever arm 525 is in a locked position (shown in FIGS. 5B-D). In this configuration, the rack latch 536 prevents the side member 103 of the body 202 of the rack 200 from exiting or slipping out of the rack receiving gap 504. In some embodiments, the rack latch 546 comprises a hook-shaped rack latch 546 wherein a side member 103 being pushed into the rack receiving gap 504 pushes the rack latch 546 sufficient to allow the side member 103 to enter the rack receiving gap 504, but a side member being pulled outward out of the rack receiving gap 504 is blocked by the hook of the rack latch 546. In some embodiments, the rack latch 546 extends across at least 50% of the rack receiving gap 504 when in the locked position. In other embodiments, the rack latch 546 extends across at least 75% or 90% of the rack receiving gap when in the locked position. In still other embodiments, the rack latch 546 extends entirely across the rack receiving gap 504 when in the lock position.

According to some aspects, a lever arm 525 is biased to the locked position. For example, the non-limiting embodiment depicted in FIG. 5D comprises a spring 500 coupled to the lever arm 525 and the fixed arm 535 and configured to bias the lever arm to the locked position wherein the rack latch 546 extends at least partially across the rack receiving gap 504. More particularly, the spring 550 may comprise a first end 551 positioned on or coupled to a tab 554 on the lever arm 525 and a second end 552 coupled to a slot 553 on the fixed arm 535. In other embodiments, the lever arm may be biased to the locked position with other biasing elements know in the art.

Figure 5A:
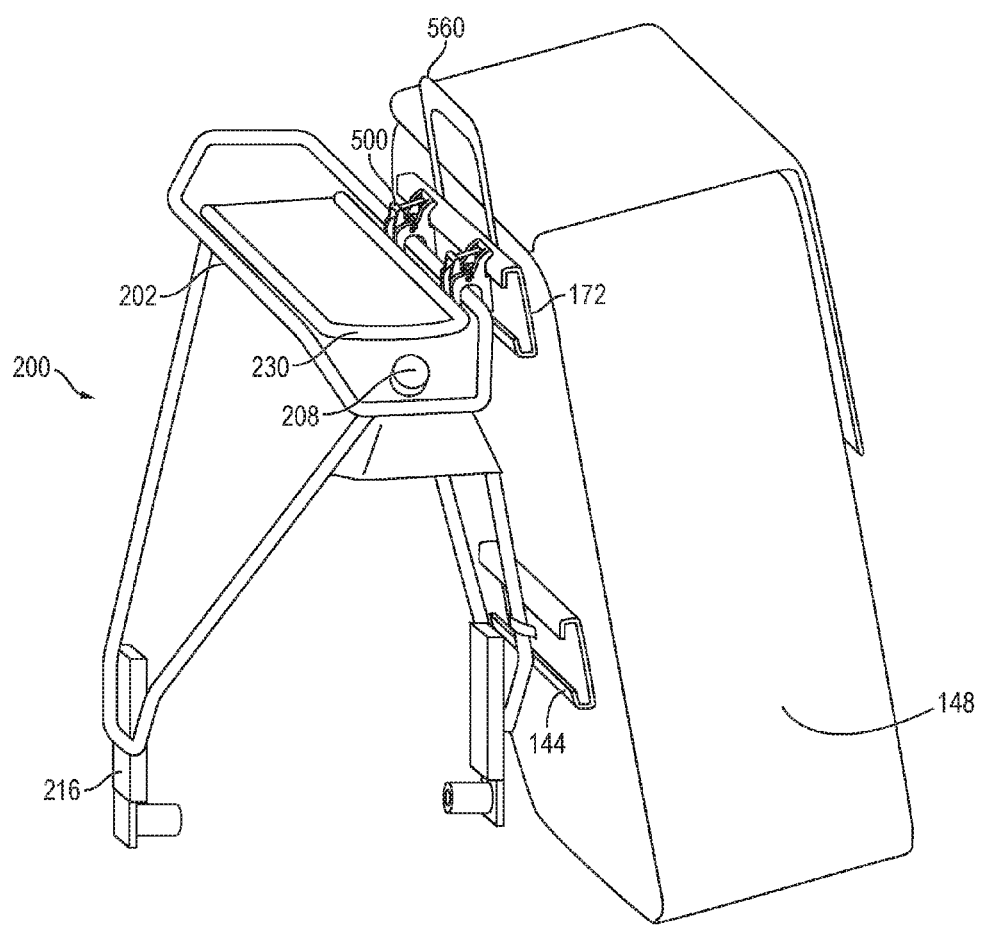
FIG. 5A is a perspective side view of a security clip coupling a pannier to a luggage rack.
Figure 5B:
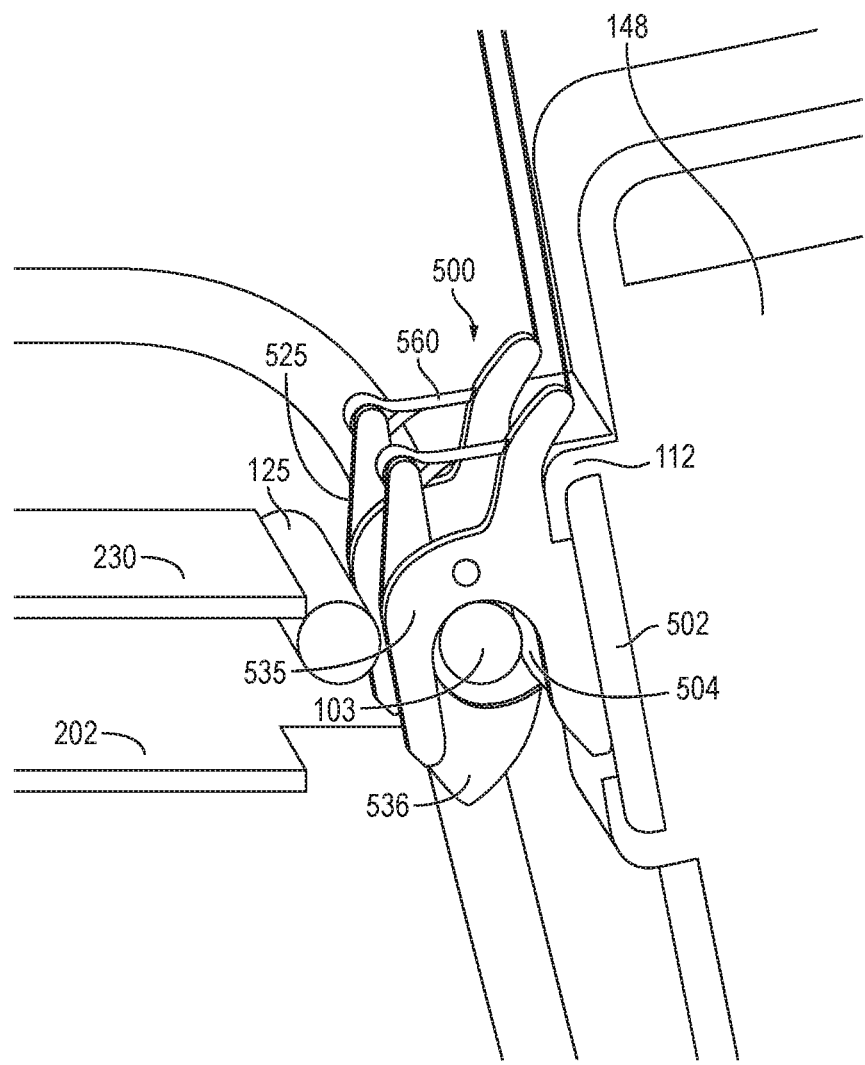
FIG. 5B is a cross-sectional view of the security clip coupling the pannier to the luggage rack of FIG. 5A.
Figure 5C:
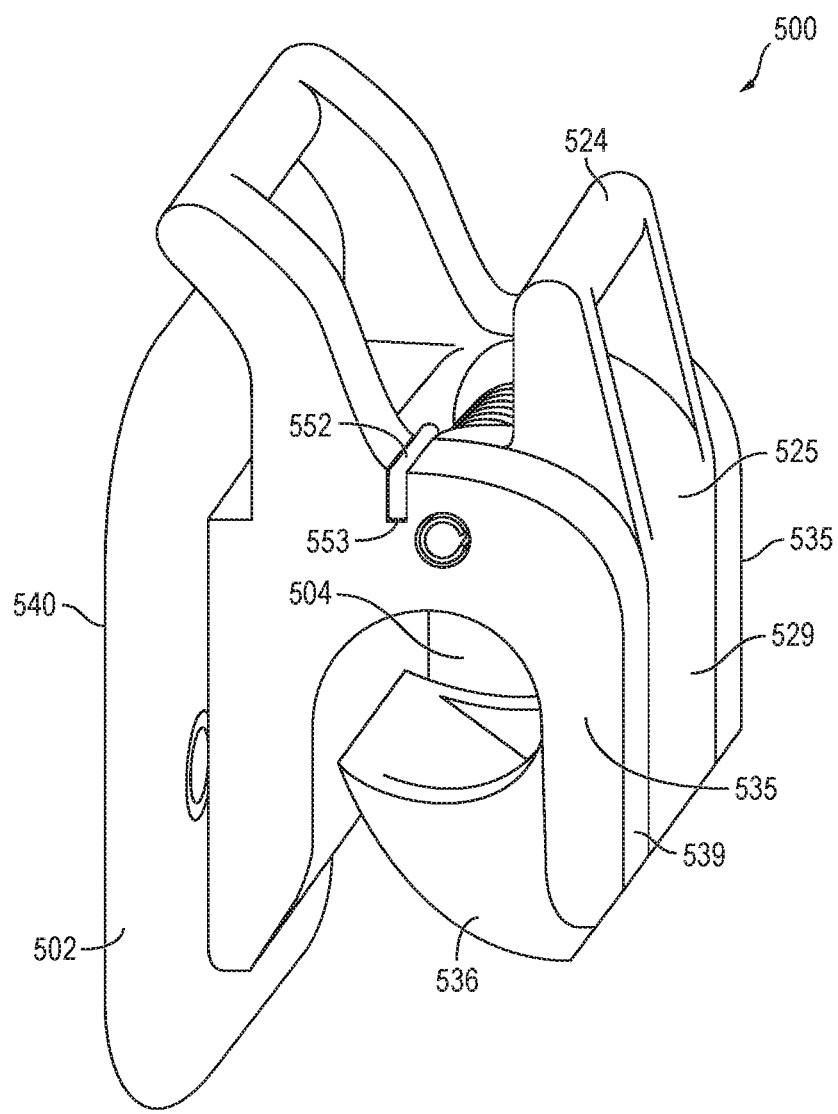
FIG. 5C is a perspective view of a second embodiment of a security clip.
Figure 5D:
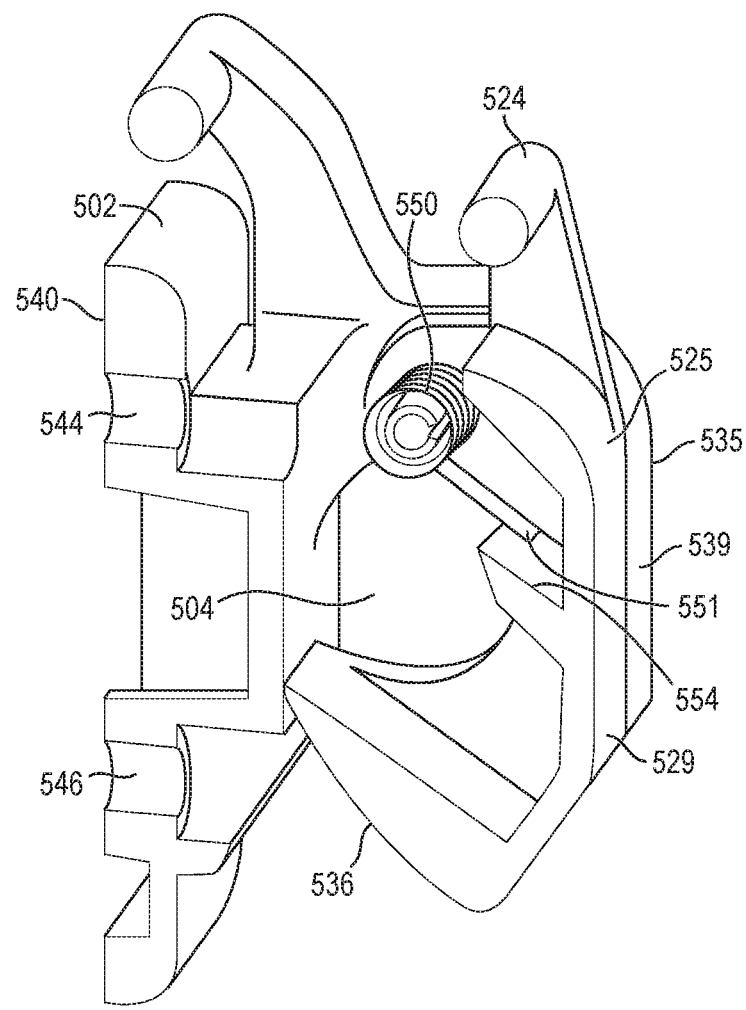
FIG. 5D is a cross-sectional view of the security clip of FIG. 5B.

One or more embodiments of a rack system may comprise a handle release 560 operably coupled to the lever arm 425 of one or more mounting clips 500. FIGS. 5A and 5B depict a non-limiting embodiment of a handle release 560. The handle release 560 is coupled to the lever arm 425 such that pulling the handle release 560 pulls the grip post 524 of the lever arm 525 toward the base component 502, back surface 540 or container 148, thus moving the rack latch 536 out of the rack receiving gap 504 sufficient to release the side member 108 from the rack receiving gap 504. In other words, pulling the handle release 560 moves the lever arm 525 from the locked position to the unlocked position. In embodiments comprising a plurality of mounting clips 500, such as the non-limiting embodiment shown in FIG. 5A, a single handle release 560 may simultaneously move the lever arm 525 from the locked position to the unlocked position. As described above, a lever arm 525 may be biased such that release of the handle release 560 reverts the lever arm 525 back to the locked position.

According to some aspects, a mounting clip 500 comprises one or more fixed arms 535 extending away from the base component 502. In some embodiments, a mounting clip 500 comprises two fixed arms 535 with a lever arm 525 positioned between the two fixed arms 535. Similar to the fixed arms 435 shown in FIGS. 4A-D, the fixed arms 535 of the mounting clip 500 form a downward direct rack receiving gap 504 between a portion of the fixed arms 535 and the base component 502 or back surface 540 of the mounting clip 500. Mounting clip 500, however, may be devoid of a lid receiving gap formed by an extending component. Instead the two fixed arms 535 may form only the rack receiving gap 504 and not a lid receiving gap similar to that shown on mounting clip 400. Nonetheless, embodiments of mounting clip 500 still prevent unwanted detachment of the mounting clip from the rack 200. For example, as shown in the non-limiting embodiment of FIG. 5B, the side member 125 of the lid 230 interfaces an outer surface 539 of each of the two fixed arms 535 and an outer surface 529 of the lever arm 525 when the lid 230 is in the closed position to prevent the lever arm 525 from leaving the locked position. An integrated lock 208 may prevent the unwanted opening of the lid 230 from the closed position to the open position, as described elsewhere in this document.

Though described primarily with reference to bicycles, a locking rack may be utilized in numerous other situations where there is a need for being able to securely carry and store items, such as, but not limited to, on a motorcycle or scooter.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure. It will be understood that implementations are not limited to the specific components disclosed herein, as virtually any components consistent with the intended operation of a method and/or system implementation for rack systems and mounting clips may be utilized. Accordingly, for example, although particular rack systems and mounting clips may be disclosed, such components may comprise any shape, size, style, type, model, version, class, grade, measurement, concentration, material, weight, quantity, and/or the like consistent with the intended operation of a method and/or system implementation for rack systems and mounting clips may be used.

In places where the description above refers to particular implementations of rack systems and mounting clips, it should be readily apparent that a number of modifications may be made without departing from the spirit thereof and that these implementations may be applied to other rack systems and mounting clips. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A lockable bicycle rack system, comprising:
   a rack comprising a body comprising a side member, a lid comprising a side member and pivotally coupled to the body between an open position and a closed position, and a locking mechanism configured to lock the lid in the closed position, the rack being configured to detachably couple to a bicycle frame; and
   a mounting clip coupled to the rack and comprising a base component adapted to couple to a container, a rack receiving gap, and a lever arm comprising a rack latch that extends at least partially across the rack receiving gap when the lever arm is in a locked position, wherein the side member of the body of the rack extends through the rack receiving gap and is locked within the rack receiving gap when the rack latch is in the locked position and the side member of the lid prevents the lever arm from leaving the locked position when the lid is in the closed position.

2. The lockable bicycle rack system of claim 1, wherein the mounting clip comprises two fixed arms, each fixed arm of the two fixed arms extending away from the base component and forming the rack receiving gap between a portion of the respective fixed arm and the base component, wherein the lever arm is positioned between the two fixed arms.

3. The lockable bicycle rack system of claim 2, wherein the side member of the lid interfaces an outer surface of each of the two fixed arms and an outer surface of the lever arm when the lid is in the closed position to prevent the lever arm from leaving the locked position.

4. The lockable bicycle rack system of claim 3, wherein the two fixed arms form only the rack receiving gap and the mounting clip is devoid of a lid receiving gap formed by an extending component.

5. The lockable bicycle rack system of claim 4, wherein the rack latch extends across at least 75% of the rack receiving gap when the lever arm is in the locked position.

6. The lockable bicycle rack system of claim 3, further comprising an extending component extending from the two fixed arms, the extending component forming an upwardly directed lid receiving gap between a portion of the extending component and the outer surfaces of the two fixed arms, wherein the lid receiving gap is positioned to receive the side member of the lid and prevent the lever arm from leaving the locked position when the lid is in the closed position, and wherein the rack receiving gap comprises a downwardly directed rack receiving gap.

7. The lockable bicycle rack system of claim 6, wherein the rack latch extends across at least 50% of the rack receiving gap when the lever arm is in the locked position.

8. The lockable bicycle rack system of claim 2, wherein the lever arm is biased to the locked position and the lever arm further comprises a grip post distal the rack latch.

9. The lockable bicycle rack system of claim 1, wherein the mounting clip comprises a plurality of mounting clips configured to couple to a channel member fixed to the container.

10. A lockable bicycle rack system, comprising:
    a rack configured to detachably couple to a bicycle frame, the rack comprising a first side member and a second side member movable between a first position and a second position;
    a mounting clip coupled to the rack and comprising a base component adapted to couple to a container, a rack receiving gap, and a lever arm comprising a rack latch extending at least partially across the rack receiving gap, wherein a portion of the first side member is positioned within the rack receiving gap and held within the rack receiving gap by the rack latch and wherein the second side member prevents the rack latch from exiting the rack receiving gap when the second side member is in the first position and the allows the rack latch to exit the rack receiving gap when the second side member is in the second position.

11. The lockable bicycle rack system of claim 10, wherein the rack comprises a body comprising the first side member and a lid pivotally coupled to the body and comprising the second side member, wherein the second side member is in the first position when the lid is in a closed position and is in the second position when the lid is in an open position.

12. The lockable bicycle rack system of claim 11, wherein the mounting clip comprises a fixed arm extending away from the base component and forming the rack receiving gap between a portion of the respective fixed arm and the base component, and wherein the second side member of the lid interfaces an outer surface of the fixed arm and an outer surface of the lever arm when the lid is in the closed position to prevent the lever arm from exiting the rack receiving gap.

13. The lockable bicycle rack system of claim 12, further comprising an extending component extending from the fixed arm, the extending component forming an upwardly directed lid receiving gap between a portion of the extending component and the outer surfaces of the fixed arm, wherein the lid receiving gap is positioned to receive the second side member of the lid and prevent the lever arm from exiting the rack receiving gap when the lid is in the closed position, and wherein the rack receiving gap comprises a downwardly directed rack receiving gap.

14. The lockable bicycle rack system of claim 10, wherein the lever arm biases the rack latch towards the base component to extend across a portion of the rack receiving gap, and wherein the lever arm further comprises a grip post distal the rack latch.

15. The lockable bicycle rack system of claim 10, wherein the mounting clip comprises a plurality of mounting clips configured to couple to a channel member fixed to the container.

16. A mounting clip for coupling and locking a container to a bicycle rack, comprising:
- a base component adapted to couple to a container;
- a fixed arm extending from the base component and forming a rack receiving gap positioned between a portion of the fixed arm and the base component, the rack receiving gap configured to receive a side member of a body of a bicycle rack; and
- a lever arm pivotally coupled to the fixed arm and comprising a rack latch, wherein the rack latch extends at least partially across the rack receiving gap when the lever arm is in a locked position and is configured to hold the side member of the body of the bicycle rack within the rack receiving gap when the lever arm is in a locked position.

17. The mounting clip of claim 16, wherein the fixed arm comprises two fixed arms, each fixed arm of the two fixed arms extending away from the base component and forming the rack receiving gap between a portion of the respective fixed arm and the base component, wherein the lever arm is positioned between the two fixed arms.

18. The mounting clip of claim 17, further comprising an extending component extending from the two fixed arms, the extending component forming an upwardly directed lid receiving gap between a portion of the extending component and the outer surfaces of the two fixed arms, wherein the lid receiving gap is positioned to receive the side member of the lid and prevent the lever arm from leaving the locked position when the lid is in the closed position, and wherein the rack receiving gap comprises a downwardly directed rack receiving gap.

19. The mounting clip of claim 16, wherein the lever arm is biased to the locked position and the lever arm further comprises a grip post distal the rack latch.

20. The mounting clip of claim 16, wherein the base component comprises one or more through holes extending through the base component, each through hole of the one or more through holes configured to receive a screw for coupling the mounting clip to a container.

* * * * *